United States Patent
Frieberg et al.

(10) Patent No.: US 11,967,721 B1
(45) Date of Patent: Apr. 23, 2024

(54) BATTERY WITH POSITIVE ELECTRODES

(71) Applicant: GM GLOBAL TECHNOLOGY OPERATIONS LLC, Detroit, MI (US)

(72) Inventors: Bradley R Frieberg, Farmington Hills, MI (US); Mengyuan Chen, Madison Heights, MI (US); Roland J. Koestner, Webster, NY (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/993,232

(22) Filed: Nov. 23, 2022

(51) Int. Cl.
*H01M 4/62* (2006.01)
*H01M 10/0568* (2010.01)
*H01M 10/0569* (2010.01)
*H01M 4/02* (2006.01)

(52) U.S. Cl.
CPC .......... *H01M 4/625* (2013.01); *H01M 4/623* (2013.01); *H01M 10/0568* (2013.01); *H01M 10/0569* (2013.01); *H01M 2004/021* (2013.01); *H01M 2004/028* (2013.01); *H01M 2300/0034* (2013.01)

(58) Field of Classification Search
CPC ............. H01M 4/623; H01M 10/0568; H01M 10/0569
USPC ........................................................ 429/338
See application file for complete search history.

(56) References Cited

U.S. PATENT DOCUMENTS

| | | | |
|---|---|---|---|
| 6,395,430 B1 * | 5/2002 | Cho | H01M 10/0568 |
| | | | 429/316 |
| 11,374,254 B2 * | 6/2022 | Zhamu | H01M 4/38 |
| 2017/0033357 A1 * | 2/2017 | Cho | H01M 4/364 |
| 2023/0092502 A1 * | 3/2023 | Wang | C09D 167/02 |
| 2023/0275235 A1 * | 8/2023 | Motoki | H01M 4/663 |
| | | | 429/209 |

FOREIGN PATENT DOCUMENTS

| | | | | |
|---|---|---|---|---|
| CN | 102106023 A | * | 6/2011 | ............. H01M 4/13 |
| JP | 2015212386 A | * | 11/2015 | ............ B01D 53/228 |
| JP | 6052520 B2 | * | 12/2016 | ............. H01G 11/38 |
| WO | WO-2019030557 A1 | * | 2/2019 | ............. H01M 4/86 |

OTHER PUBLICATIONS

Wang, X., Proton Exchange Membrane Water Electrolysis Using Sulfo-Phenylated Polyphenylene as Membrane and Ionomer, Fall 2021, Dept. of Chemistry, Simon Fraser University, p. iii, 16 (Year: 2021).*

* cited by examiner

*Primary Examiner* — Pamela H Weiss
*Assistant Examiner* — John S Medley

(57) ABSTRACT

A battery cathode includes: a current collector; and a coating applied to the current collector, the coating including: conductive carbon; polyvinylidene fluoride binder polymer; acid-functionalized dispersant polymer; and electrochemically active layered metal oxide.

18 Claims, 6 Drawing Sheets

BATTERY WITH POSITIVE ELECTRODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to batteries and more particularly to cathodes of batteries.

Vehicles with an engine include a battery for starting the engine and supporting accessory loads. Electric vehicles (EVs) such as battery electric vehicles (BEVs), hybrid vehicles, and/or fuel cell vehicles include one or more electric machines and a battery system including one or more battery cells, modules and/or packs to provide propulsion power. A power control system is used to control power to/from the battery system during charging, propulsion and/or regeneration.

Lithium-ion batteries (LIBs) have high power density and are used in EV and non-EV applications. LIBs include anode electrodes, cathode electrodes and separators. The anode electrodes include active material arranged on one or both sides of a current collector. The cathode electrodes include cathode active material arranged on one or both sides of a current collector.

SUMMARY

In a feature, a battery cathode includes: a current collector; and a coating applied to the current collector, the coating including: conductive carbon; polyvinylidene fluoride binder polymer; acid-functionalized dispersant polymer; and electrochemically active layered metal oxide.

In further features, the conductive carbon includes carbon black.

In further features, the conductive carbon has a surface area of between approximately 45 square meters per gram and approximately 300 square meters per gram.

In further features, the conductive carbon further includes carbon nanotubes with a surface area between approximately 200 square meters per gram and approximately 1300 square meters per gram.

In further features, the carbon nanotubes include single wall carbon nanotubes.

In further features, the carbon nanotubes include multi-wall carbon nanotubes.

In further features, the conductive carbon includes graphene nanoplatelets with a surface area between approximately 50 square meters per gram and approximately 250 square meters per gram.

In further features, the carbon includes a mixture of carbon black and multi-wall carbon nanotubes.

In further features, the conductive carbon comprises only multi-wall carbon nanotubes.

In further features, the acid functionalized dispersant polymer has a milliequivalent (meq) between approximately 0.05 and 5.0 per gram polymer.

In further features, the acid functionalized dispersant polymer includes sulfo-phenylated polyphenylene (SPPP—H).

In further features, the acid functionalized dispersant polymer includes a sulfonated derivate of poly(arylene ether) (SPAE), poly(arylene ether sulfone) (SPAES), poly(arylene sulfide) (SPAS), sulfonated polyimide (SPI), sulfonated polyphenylene (SPP), and combinations thereof, and one or more cations selected from H+, Li+, Na+, K+, and NH4.

In further features, the acid functionalized dispersant polymer includes a derivatized polyvinylidene fluoride (PVDF) copolymer with one of tetraifluoroethylene (TFE) and hexafluoropropylene (HFP).

In further features, the acid functionalized dispersant polymer includes a derivatized polyvinylidene fluoride (PVDF) copolymer with tetrafluoroethylene (TFE) and a monomer mass ratio of VDF to TFE is 4:1 w/w.

In further features, the acid functionalized dispersant polymer includes mass fractions of approximately 95-50% polyvinylidene fluoride (PVDF) homopolymer and 5-50% acid functionalized copolymer, respectively.

In a feature, a battery includes: a cathode including: a current collector; and a coating applied to the current collector, the coating including: conductive carbon; polyvinylidene fluoride binder polymer; acid-functionalized dispersant polymer; and electrochemically active layered metal oxide; an anode; and an electrolyte.

In further features, the anode includes silicon oxide.

In further features, the electrolyte includes lithium hexafluorophosphate (LiPF$_6$).

In further features, the electrolyte further includes fluoroethylene carbonate (FEC).

In further features, the electrolyte further includes vinyl chloride (VC).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Lithium ion batteries (LIBs) include anode electrodes, cathode electrodes and separators. The anode electrodes include active material arranged on opposite sides of a current collector. The cathode electrodes include cathode active material arranged on opposite sides of a current collector.

Electrochemical performance of a high capacity cathode depends on two internal resistances: the pore channel tortuosity for lithium ion transport and the conductive carbon network for electronic transport to the electrochemically active site. These resistances play an even larger role in performance at higher charge and discharge rates. The present application involves a binder polymer and conductive carbon blends that minimize the internal resistances of such a cathode and achieve improved battery cell performance.

Figure 1:
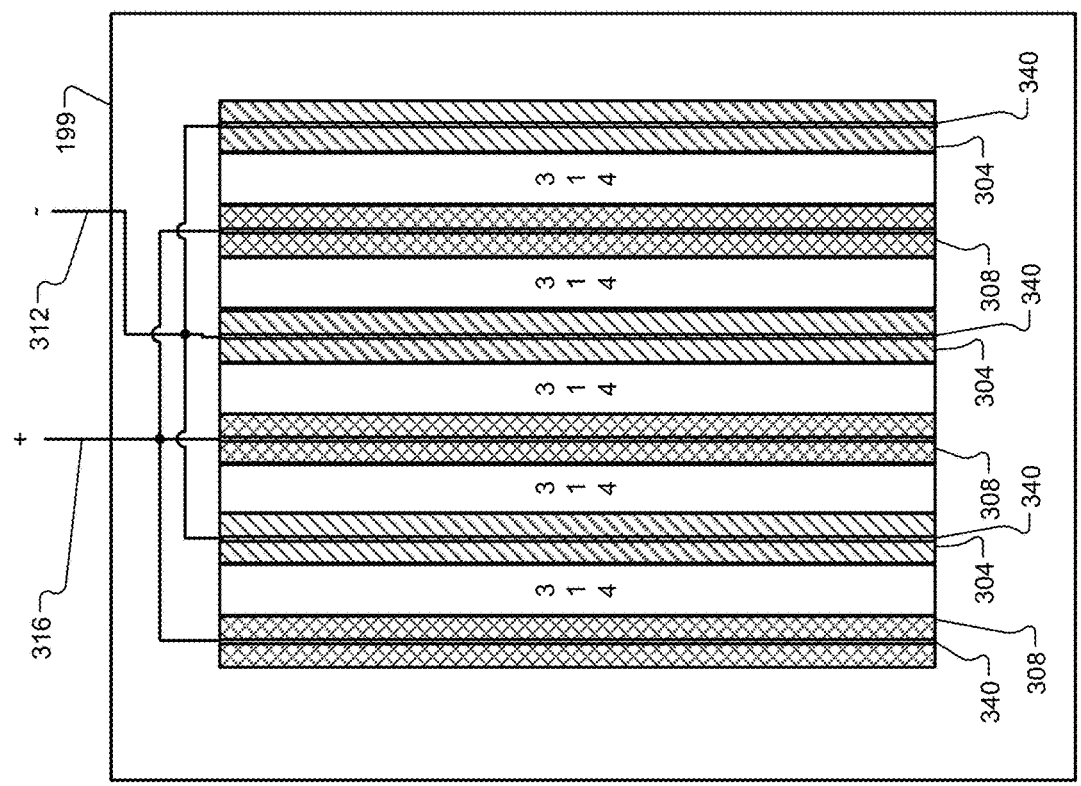
FIG. 1 is a functional block diagram of an example implementation for a stacked electrode configuration in a battery, such as in a vehicle.

FIG. 1 is a functional block diagram of an example implementation of a battery 199. The battery 199 includes a plurality of electrodes which are separated into opposing anodes 304 and cathodes 308. While the example of the battery 199 includes six pairs of opposing anodes and cathodes, the battery 199 may have a different stack electrode count. The battery 199 may be a coin type battery cell, a prismatic battery cell, a pouch battery cell, or have another suitable form factor.

The battery 199 may also include one or more other components. For example, separators 314 may be disposed between the anode 304 and cathode 308 pairs. The electrode coatings are applied to one or both sides of the current collectors (e.g., 340).

An electrolyte including lithium, such as lithium hexafluorophosphate (LiPF$_6$), is provided within the battery 199. While the example of lithium hexafluorophosphate is provided, the present application is also applicable to other types of electrolytes including lithium and other types of electrolytes, such as organic solvents, e.g., esters, F-carbonate, and ethers. The electrolyte may include a lithium salt, such as salts, e.g., LiPF$_6$, LiTSI, or LiBF$_4$. While the example of a lithium ion battery is described, the present application is also applicable to lithium metal batteries and other types of batteries. The anodes 304 are electrically connected to a negative bus and terminal 312 of the battery 199. The cathodes 308 are electrically connected to a positive bus bar and terminal 316 of the battery 199. The battery 199 can output and receive power (discharge and charge) via the positive and negative terminals.

The anodes and cathodes 304 and 308 may be made of one or more (e.g., metal) materials or one or more other types of materials that is/are electrically conductive. As an example, the anodes 304 may be made of and include lithiated graphite (LiC$_6$), silicon (Si), silicon oxide (SiO$_x$), lithium silicon oxide (LiSiO$_x$), graphite and silicon, or one or more other suitable types of metal. The anodes 304 may be lithiated after formation.

As examples, the cathodes 308 may be made of and include material that can undergo a reversible redox reaction with lithium, e.g., a material that can undergo lithium intercalation and deintercalation, alloying and dealloying, or plating and stripping.

The anodes and the cathodes 304 and 308 may be interleaved and alternating such that an anode is disposed between two consecutive cathodes, and a cathode is disposed between two consecutive anodes, such as illustrated. The anodes and the cathodes are formed during a process that may be referred to as formation (or cell formation). The electrolyte is injected into the battery 199 through one or more apertures. Formation may be deemed completed (and the anodes and cathodes may be charged) when a predetermined number (e.g., 1 or more) cycles of charging and discharging of the battery 199 have been performed with the electrolyte within the battery 199.

Figure 2:
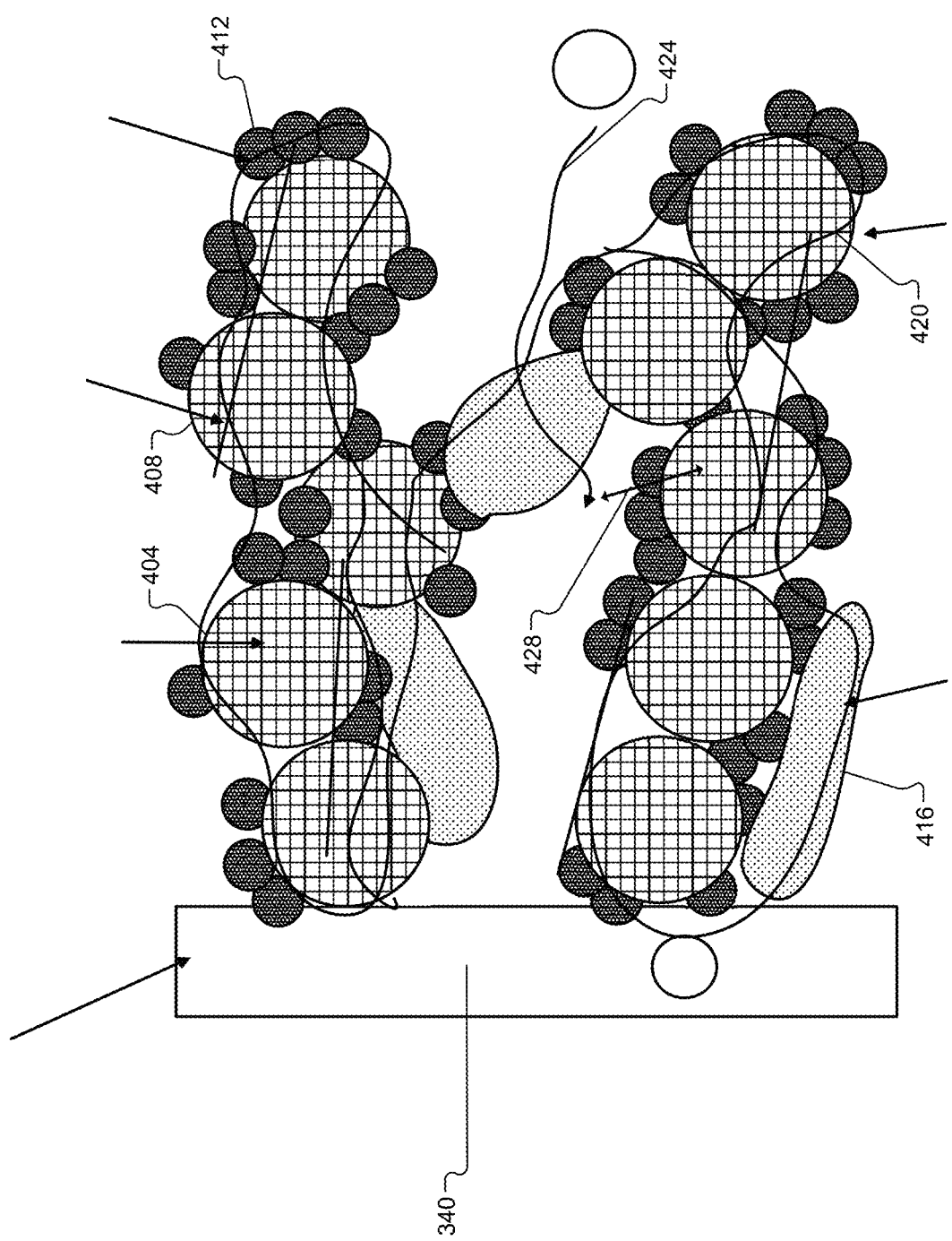
FIG. 2 is a perspective view including an example portion of a battery cathode.

FIG. 2 is a perspective view including an example portion of a cathode 308. As illustrated, the cathode 308 includes a current collector, here numbered 340. The cathode coating may include an active material 404, carbon nanotubes (CNTs) 408, carbon black (CB) 412, graphite nanoplatelets (GNPs) 416, and a binder and dispersant 420 that are disposed on the current collector 340. The internal transport resistances are associated with the pore channel tortuosity for ionic resistance that is illustrated by 424 ($R_{ion}$) and with the conductive carbon network for electronic resistance that is illustrated by 428 ($R_e$). In various implementations, the graphene nanoplatelets may have a surface area between approximately 50 square meters per gram and approximately 250 square meters per gram, such as between approximately 50 and 100 square meters per gram.

The positive electrode active material 404 may include an intercalation host material that can undergo the reversible insertion or intercalation of lithium ions.

The high-nickel electroactive material may be selected from the group including or consisting of NMC (LiNi$_{1-x-y}$Co$_x$Mn$_y$O$_2$) (where 0≤x≤1 and 0≤y≤1), NCMA (LiNi$_{1-x-y-z}$Co$_x$Mn$_y$Al$_z$O$_2$) (where 0≤x≤1, 0≤y≤1, and 0≤z≤1), NCA (LiNi$_{1-x-y}$Co$_x$Al$_y$O$_2$, where 0≤x≤1 and 0≤y≤1), LNMO (LiNi$_x$Mn$_{1-x}$O$_2$, where 0≤x≤1) and combinations thereof.

The positive electrode may further include a second electroactive material. The second electroactive material may be selected from the group including or consisting of: lithium manganese oxide (Li$_{(1+x)}$Mn$_2$O$_4$, where 0.1≤x≤1) (LMO), lithium nickel manganese oxide (LiNi$_{0.5}$Mn$_{1.5}$O$_4$), lithium cobalt oxide (LiCoO$_2$) (LCO), lithium iron phosphate (LiFePO$_4$), lithium vanadium phosphate (LiVPO$_4$), lithium manganese iron phosphate (LiMn$_{1-x}$Fe$_x$PO$_4$, where 0≤x≤1), and combinations thereof.

The coating includes a high molecular weight (MW) polyvinylidene fluoride (PVDF) binder for cohesive strength that is blended with an acid functionalized polymer for lower pore tortuosity (and improved lithium ion transport) for high nickel cathodes, such as cathodes including NCMA.

The acid functionalized polymer can be selected from a broad range in backbone composition and acid loading. In one example, these include polyvinylidene fluoride (co) polymers with acidic monomers which carry carboxylic or sulfonic acid functional groups. In another example, these include sulfonated aromatic ionomers such as a sulfonated derivative of poly(arylene ether) (SPAE), poly(arylene ether sulfone) (SPAES), poly(arylene sulfide) (SPAS), sulfonated polyimide (SPI), sulfonated polyphenylene (SPP), and combinations thereof, and one or more cations selected from H$^+$, Li$^+$, Na$^+$, K$^+$, and NH$_4^+$. The acid loading for these polymers may range from 0.05 to 5.0 meq/g polymer.

The coating also includes carbon nanotubes (CNTs), such as single wall CNTs (SWCNTs) or multi wall CNTs (MWCNTs). SWCNTs may percolate a conductive network more easily than MWCNTs, but the more rigid structure and lower capillary pressure during solvent drying may lead to a lower pore channel tortuosity for the MWCNTs. The coating also includes carbon black whereby certain grades offer a higher surface area above 100 m$^2$/g that then provides more electrical contact points and improves local electronic resistance.

Generally speaking, a cathode coating is provided with a unique formulation comprising a binder blend that includes high MW PVDF and acid-functionalized polymers along with a conductive carbon package that includes high surface area carbon black with either single-wall or multi-wall carbon nanotubes.

Figure 3:
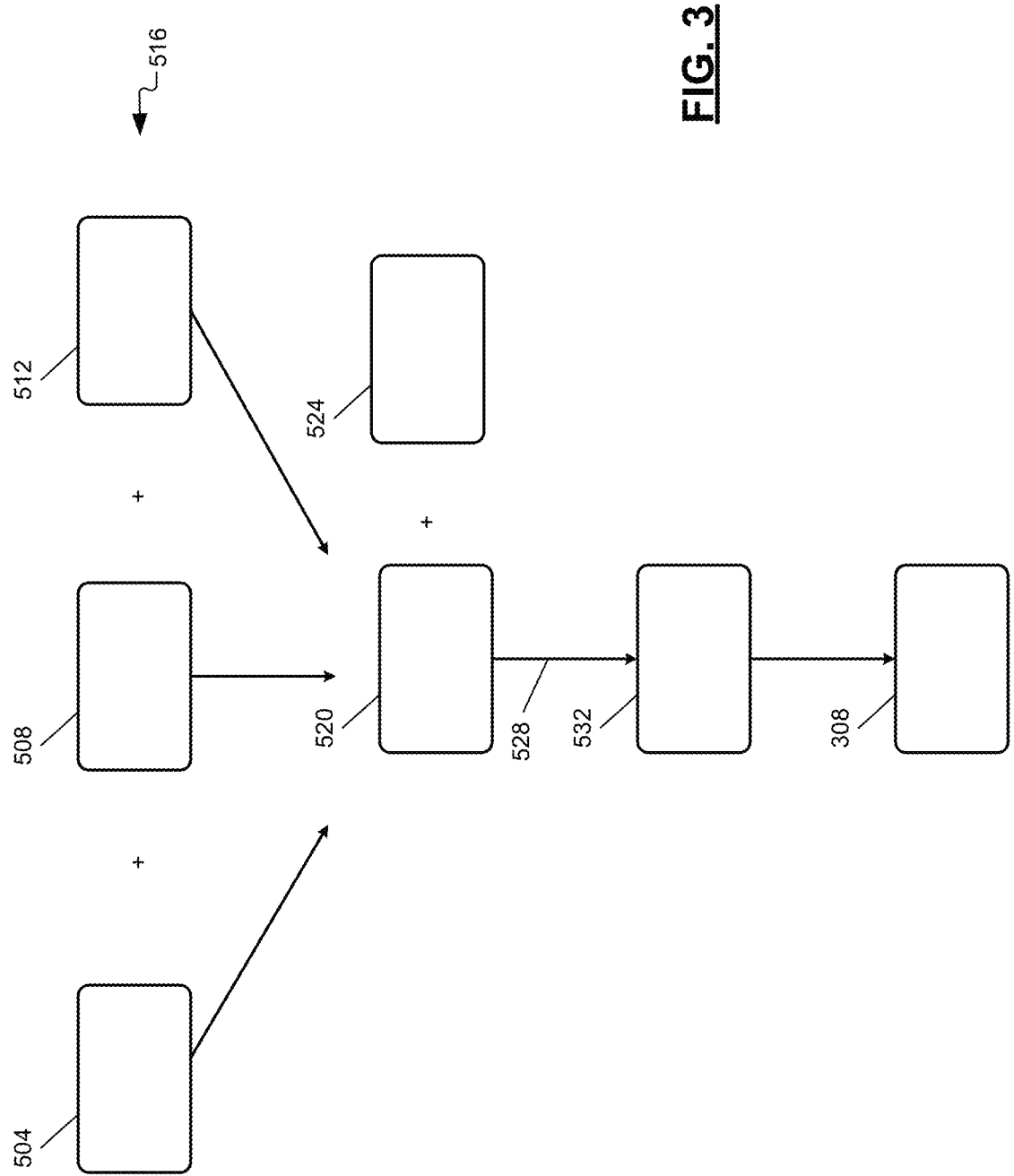
FIG. 3 is an illustration of an example method for manufacturing a battery cathode.

FIG. 3 is an illustration of an example method of manufacturing of one of the cathodes 308. An active material 504, an electrically conductive filler 508, and a polymer binder with a dispersant 512 are mixed at 516 to form a slurry 520. The active material may be, for example NCMA. The conductive filler includes carbon black, such as having a surface area of between approximately 45 and 300 meters squared per gram. The polymer binder and dispersant includes an acid, for example, between approximately 0.13 and 3.3 meq per gram.

A solvent 524 is added to the slurry. The solvent 524 may be, for example, N-methyl-2-pyrrolidone (NMP), dimethylacetamide (DMAc or DMA), dimethylformamide (DMF), dimethyl sulfoxide (DMSO), or another suitable type of solvent.

The slurry 520 with the solvent 524 is applied, such as by coating (e.g., dip coating) onto a foil (e.g., the current collector) at 528. At 532, drying is performed (e.g., via heating) to remove the solvent (e.g., by evaporation). The cathode 308 may be complete after the drying is performed, or one or more additional processes may be performed. (e.g., via heating) to remove the solvent (e.g., by evaporation). The cathode 308 may be complete after the drying is performed, or one or more additional processes may be performed.

In various implementations, the battery 199 includes anodes including approximately 5.5% silicon oxide ($SiO_x$). Percentages expressed herein may be percentages by mass. The cathodes may include, for example, approximately 97.0% NCMA, approximately 1.5% carbon, and approximately 1.5% polymer w/w solids and have approximately 5.0 milliamp hour (mAh) capacity per square centimeter ($cm^2$) at approximately 30% v/v porosity. The electrolyte may be, for example, 1 M lithium hexafluorophosphate ($LiPF_6$) in EC:DMC 3:7 w/w and approximately 2% fluoroethylene carbonate (FEC) and approximately 1% vinyl chloride (VC). The battery 199 may have approximately 1.5 $cm^2$ active area with N/P approximately equal to 1.1.

Regarding the approximately 1.5% carbon component, approximately 0.8% carbon black and approximately 0.6% graphene nanoplatelets and approximately 0.1% SWCNT may be used in a ternary mixture. Alternatively, approximately 0.25-1.5% MWCNT and 1.25-0% carbon black, respectively, may be used in a binary mixture. In the example of 1.5% MWNT, no carbon black may be included. In various implementations, the carbon includes a binary mixture of carbon black and multi-wall carbon nanotubes. The total carbon loading may be formulated between 1.0 and 5.0% of the cathode solids, such as between 1.0 and 2.0% of the cathode solids.

The MWCNTs may have a surface area of approximately 300 square meters ($m^2$) per gram (g) in various implementations. The SWCNTs may have a surface area of approximately 400 $m^2/g$ in various implementations. The carbon black may be a furnace black with a surface area of approximately 45-65 $m^2/g$ in various implementations. Alternatively, the carbon black may be, for example, an acetylene black with a surface area of approximately 130-240 $m^2/g$ in various implementations. Alternatively, the carbon black may be, for example, another acetylene black with a surface area of approximately 300 $m^2/g$ in various implementations. In various implementations, the carbon nanotubes may have a surface area between approximately 200 square meters per gram and approximately 1300 square meters per gram or between approximately 250 and 450 square meters per gram.

Regarding the polymer binder package, approximately 95-50% polyvinylidene fluoride (PVDF) homopolymer may be used with 5-50% acid functionalized PVDF (co)polymer or aromatic ionomer. The acid functionalized PVDF (co) polymer may be, for example, P(VDF (vinylidene fluoride): TFE (trifluoro ethylene)::4:1 w/w) with approximately 0.13 meq carboxylic acid per gram polymer. Alternately, the acid functionalized polymer may have a very different backbone composition and acid loading such as sulfo-phenylated polyphenylene (SPPP—H), with approximately 3.3 meq sulfonic acid per gram polymer. In various implementations, the acid functionalized dispersant polymer has a meq between approximately 0.05 and 5.0 per gram polymer. In various implementations, the acid functionalized polymer includes one of sulfo-phenylated polyphenylene (SPPP—H) and a sulfonated derivate of poly(arylene ether) (SPAE), poly(arylene ether sulfone) (SPAES), poly(arylene sulfide) (SPAS), sulfonated polyimide (SPI), sulfonated polyphenylene (SPP), and combinations thereof, and one or more cations selected from H+, Li+, Na+, K+, and $NH_4$+.

Figure 4:
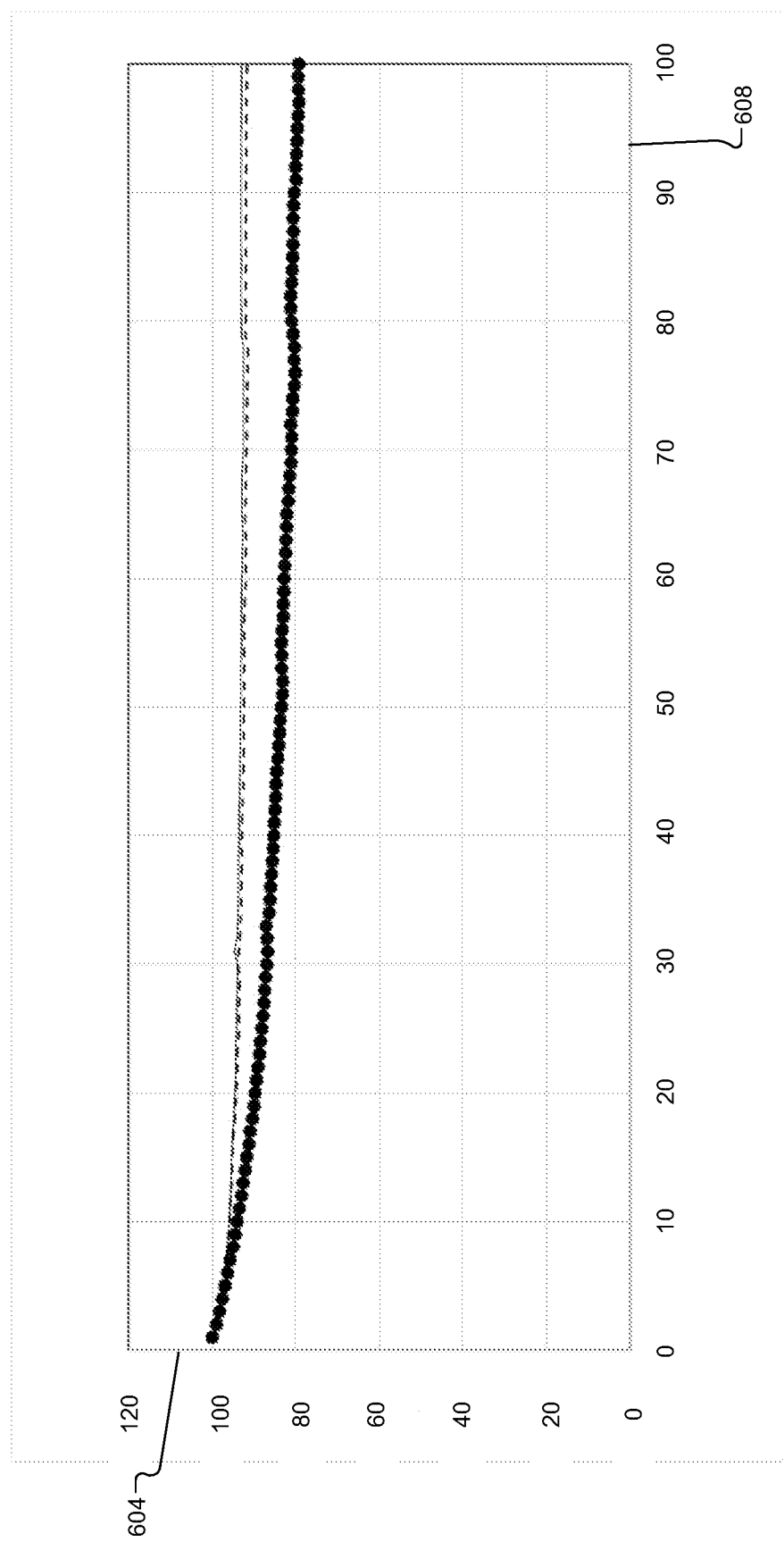
FIG. 4 includes an example graph of discharge capacity retention for a battery cell with charge cycling for different cathode polymer blends and a ternary conductive carbon mixture.

FIG. 4 includes an example graph of discharge capacity retention 604 with charge cycling 608 for different cathode polymer blends. As illustrated, the above binder blend with acid functionalized polymers perform better (e.g., decrease in discharge capacity retention more slowly) than PVDF homopolymer alone. In this case, the ternary carbon blend package comprises 0.8% CB and 0.6% GNP and 0.1% SWCNT w/w solids.

Figure 5:
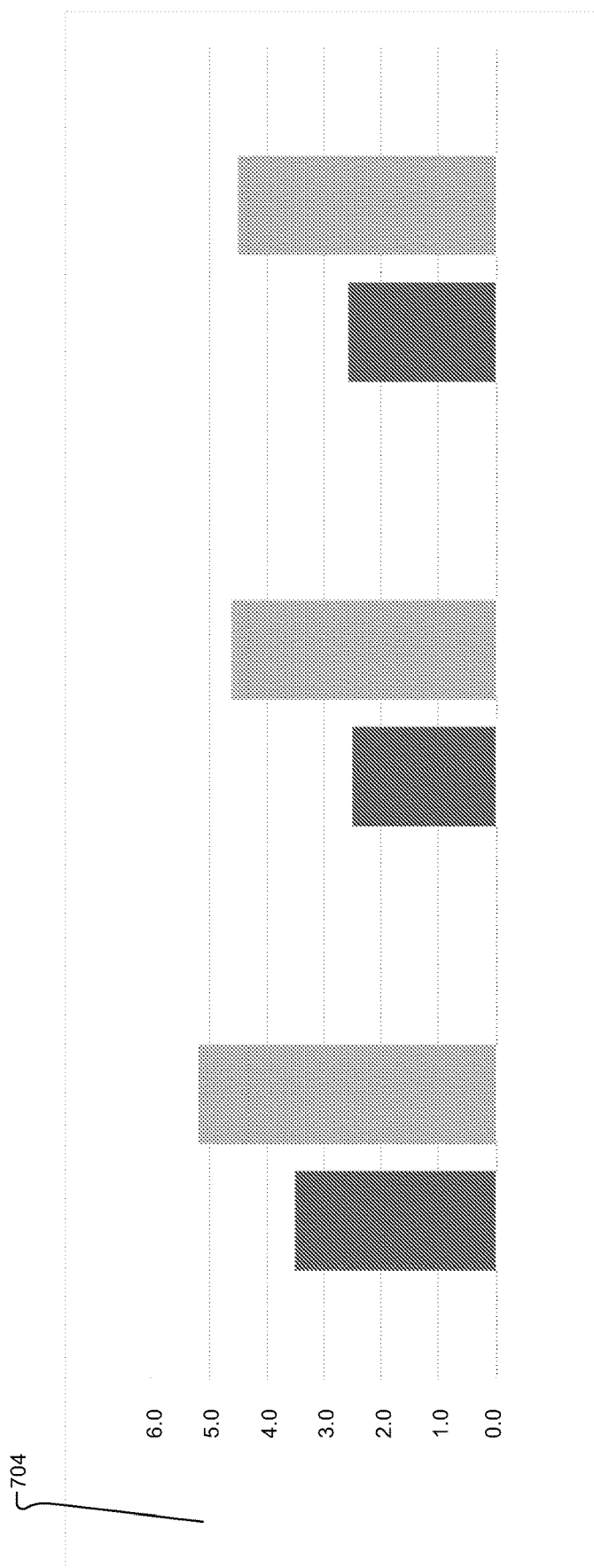
FIG. 5 includes an example bar graph of internal transport resistances in a battery cathode for different polymer blends and a binary conductive carbon mixture.

FIG. 5 includes an example bar graph of the internal transport resistances 704 for different cathode polymer blends. As illustrated, the above binder blend with acid functionalized polymers provide more efficient transport through the cathode volume (lower electronic+ionic resistance) than PVDF alone. In this case, the binary carbon blend package comprises 0.5% CB and 1.0% MWCNT w/w solids.

Figure 6:
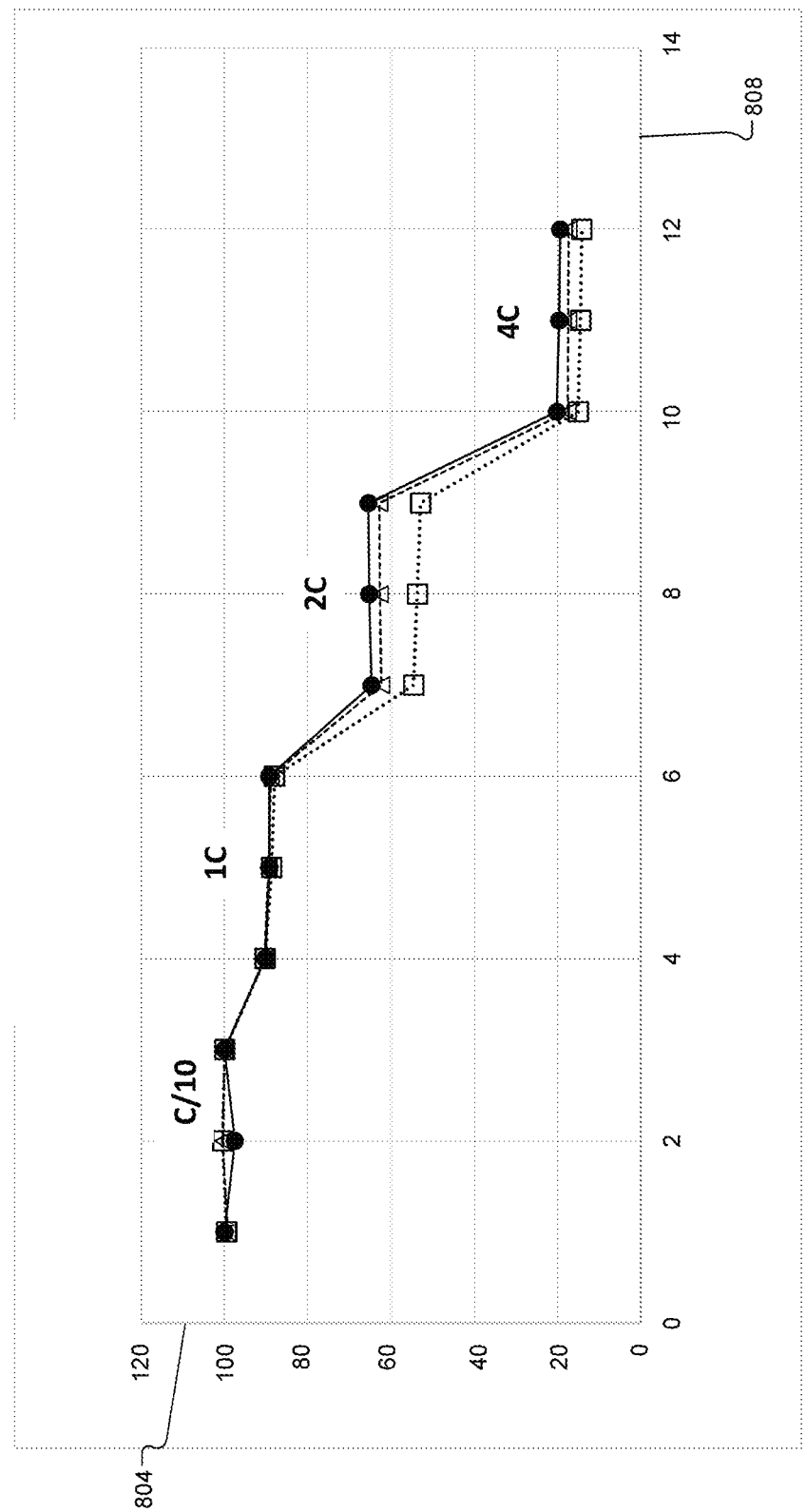
FIG. 6 includes an example graph of discharge capacity retention for a battery cell with charge cycling for different cathode polymer blends and a binary conductive carbon mixture.

FIG. 6 includes an example graph of retention capacity 804 with charge cycling 808 for different cathode polymer blends. The above binder blend with acid functionalized polymers provide improved discharge capacity retention at high current density due to the lower electronic and ionic resistance than PVDF alone. In this case, the binary carbon blend package again comprises 0.5% CB and 1.0% MWCNT w/w solids.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery cathode comprising:
   a current collector; and
   a coating applied to the current collector, the coating including:
   conductive carbon;
   polyvinylidene fluoride binder polymer;
   acid-functionalized dispersant polymer; and
   electrochemically active layered metal oxide,
   wherein the acid functionalized dispersant polymer has a milliequivalent (meq) between approximately 0.05 and 5.0 per gram polymer, and
   wherein the acid functionalized dispersant polymer includes (a) one or more cations selected from H+, Li+, Na+, K+, and NH4+ and (b) at least one of a sulfonated derivate of poly(arylene ether) (SPAE), poly(arylene ether sulfone) (SPAES), poly(arylene sulfide) (SPAS), sulfonated polyphenylene (SPP).

2. The cathode of claim 1 wherein the conductive carbon includes carbon black.

3. The cathode of claim 1 wherein the conductive carbon has a surface area of between approximately 45 square meters per gram and approximately 300 square meters per gram.

4. The cathode of claim 1 wherein the conductive carbon further includes carbon nanotubes with a surface area between approximately 200 square meters per gram and approximately 1300 square meters per gram.

5. The cathode of claim 4 wherein the carbon nanotubes include single wall carbon nanotubes.

6. The cathode of claim 4 wherein the carbon nanotubes include multi-wall carbon nanotubes.

7. The cathode of claim 1 wherein the conductive carbon includes graphene nanoplatelets with a surface area between approximately 50 square meters per gram and approximately 250 square meters per gram.

8. The cathode of claim 1 wherein the conductive carbon includes a mixture of carbon black and multi-wall carbon nanotubes.

9. The cathode of claim 1 wherein the conductive carbon comprises only multi-wall-wall carbon nanotubes.

10. The cathode of claim 1 wherein the acid functionalized dispersant polymer includes sulfo-phenylated polyphenylene (SPPP—H).

11. The cathode of claim 1 wherein the acid functionalized dispersant polymer further includes a derivatized polyvinylidene fluoride (PVDF) copolymer with one of tetraifluoroethylene (TFE) and hexafluoropropylene (HFP).

12. The cathode of claim 11 wherein the acid functionalized dispersant polymer further includes a derivatized polyvinylidene fluoride (PVDF) copolymer with tetrafluoroethylene(TFE) and a monomer mass ratio of vinylidene fluoride (VDF) to TFE is 4:1 w/w.

13. The cathode of claim 12 wherein the acid functionalized dispersant polymer includes mass fractions of approximately 95-50% polyvinylidene fluoride (PVDF) homopolymer and 5-50% acid functionalized copolymer, respectively.

14. A battery comprising:
   a cathode including:
     a current collector; and
     a coating applied to the current collector, the coating including:
       conductive carbon;
       polyvinylidene fluoride binder polymer;
       acid-functionalized dispersant polymer; and
       electrochemically active layered metal oxide;
   an anode; and
   an electrolyte,
     wherein the acid functionalized dispersant polymer has a milliequivalent (meq) between approximately 0.05 and 5.0 per gram polymer, and
     wherein the acid functionalized dispersant polymer includes (a) one or more cations selected from H+, Li+, Na+, K+, and NH4+ and (b) at least one of a sulfonated derivate of poly(arylene ether) (SPAE), poly(arylene ether sulfone) (SPAES), poly(arylene sulfide) (SPAS), sulfonated polyphenylene (SPP).

15. The battery of claim 14 wherein the anode includes silicon oxide.

16. The battery of claim 14 wherein the electrolyte includes lithium hexafluorophosphate ($LiPF_6$).

17. The battery of claim 16 wherein the electrolyte further includes fluoroethylene carbonate (FEC).

18. The battery of claim 16 wherein the electrolyte further includes vinyl chloride (VC).

\* \* \* \* \*